(12) United States Patent
Slice (10) Patent No.: US 6,816,632 B1
(45) Date of Patent: Nov. 9, 2004

(54) GEOMETRIC MOTION ANALYSIS

(75) Inventor: Dennis E. Slice, Rocky Point, NY (US)

(73) Assignee: Wake Forest University Health Sciences, Winston-Salem, NC (US)

( * ) Notice: Subject to any disclaimer, the term of this patent is extended or adjusted under 35 U.S.C. 154(b) by 0 days.

(21) Appl. No.: 09/506,463

(22) Filed: Feb. 17, 2000

(51) Int. Cl.$^7$ .................................................. G06K 9/32

(52) U.S. Cl. ....................... 382/294; 382/291; 382/293; 382/295

(58) Field of Search ................................. 382/294, 154, 382/107, 236, 293, 295, 291; 703/1; 434/55

(56) References Cited

U.S. PATENT DOCUMENTS

| | | | | |
|---|---|---|---|---|
| 3,996,590 A | * | 12/1976 | Hammack | 343/112 R |
| 5,179,525 A | * | 1/1993 | Griffis et al. | 703/1 |
| 5,719,947 A | * | 2/1998 | Enomoto et al. | 382/107 |
| 5,758,298 A | * | 5/1998 | Guldner | 701/23 |
| 5,796,426 A | | 8/1998 | Gullichsen et al. | 348/207 |
| 5,960,097 A | | 9/1999 | Pfeiffer et al. | 382/63 |
| 6,005,610 A | | 12/1999 | Pingali | 348/169 |
| 6,192,145 B1 | * | 2/2001 | Anandan et al. | 382/154 |

OTHER PUBLICATIONS

Tomasi et al., "Shape and Motion without Depth", Third International Conference, Dec. 1990, pps. 91–95.*

Ghosh et al., "Sensor–Based Hybrid Position/Force Control of a Robot Manipulator in an Uncalibrated Environment", IEEE Trnasactions on Control Systems Technology, vol. 8, No. 4, Jul. 2000, pps. 635–645.*

Alferez et al., "Image Indexing and Retrieval Using Image–Derived, Geomtrically and Illumination Invariant Features", IEEE, International Conference on Multimedia Computing and Systems, vol. 1, Jun. 1999, pps. 177–182.*

Calvagno et al., "Three–Dimensional Motion Estimation of Objects for Video Coding", IEEE, Journal on Selected Areas in Communications, vol. 16, No. 1, Jan. 1998, pps. 86–97.*

M. Yang, et al., "Extracting Gestural Motion Trajectories", Beckman Institute and Department of Electrical and Computer Engineering, University of Illinois at Urbana–Champaign, IEEE 1998, pp. 10–15.

M. Shah, et al., "Motion Trajectories", IEEE Transactions on Systems, Man and Cybernetics, vol. 23, No. 4, Jul./Aug. 1993, pp. 1138–1150.

F.P. Kuhl, et al., "Elliptic Fourier of a Closed Contour", Computer Graphics and Image Processing 18, 1982, pp. 236–258.

(List continued on next page.)

*Primary Examiner*—Anh Hong Do
(74) *Attorney, Agent, or Firm*—Scully, Scott, Murphy & Presser (57) ABSTRACT

A method for geometrically analyzing motion having the steps of: choosing a set of points having at least three individual points to define a single realization of a motion; sequentially collecting Cartesian coordinates of the set of points at different times during the motion from a start point to an end point; treating the collection of sets of points as a sample of the motion; and transforming the sets of points at the different times to a common coordinate system thereby defining a trajectory of the motion. In a preferred implementation of the method of the present invention, the method further has the steps of: choosing a set of points having at least three individual points to define a single realization of a motion; sequentially collecting Cartesian coordinates of the set of points at different times during the motion from a start point to an end point; treating the collection of sets of points as a sample of the motion; transforming the sets of points at the different times to a common coordinate system thereby defining a trajectory of the motion; and calculating elliptic Fourier coefficients describing the trajectory of the motion independent of any difference in the spacing of the different times.

14 Claims, 6 Drawing Sheets

OTHER PUBLICATIONS

P. Haggard, et al., "Spatial Patterns in the Control of Human Arm Movement", Journal of Experimental Psychology: Human Perception and Performance, vol. 22, No. 1, 1996, pp. 42–266.

D.G. Kendall, "Shape Manifolds, Procrustean Metrics, and Complex Projective Spaces", Bull. London Math. Soc., 16 (1984), pp. 81–121.

D.E. Slice, et al., "A Glossary for Geometric Morphometrics", Advances in Morphometrics, Series A: Life Sciences vol. 284, pp. 531–551.

F.J. Rohlf, et al., "Extensions of the Procrustes Method For The Optimal Superimposition Of Landmarks", Syst. Zool., 39(1): 1990, 40–59.

D.G. Kendall, "Exact Distributions For Shapes Of Random Triangles In Convex Sets", Adv. Appl. Prob. 17, 1985, 308–329.

S. Ferson, et al., "Measuring Shape Variation Of Two–Dimensional Outlines", Syst. Zool., 34(1), 1985, 59–68.

R. Montgomery, "The geometric phase of the three–body problem", Nonlinearity 9, pp. 1341–1360, 1996.

* cited by examiner

FIG. 1A

*brevistrokus*

FIG. 1B

*longistrokus*

FIG. 1C

*elliptistrokus*

GEOMETRIC MOTION ANALYSIS

BACKGROUND OF THE INVENTION

1. Field of the Invention

The field of art to which this invention relates is motion analysis, and more particularly to geometric methods for analyzing shape changes resulting from repetitive motions using Elliptic Fourier Analysis (EFA).

2. Description of the Related Art

Geometric morphometric methods characterize the shape of a configuration of landmarks in such a way as to retain all of the relative spatial information encoded in the original data throughout an analysis (See, Slice, D. E., F. L. Bookstein, L. F. Marcus, and F. J. Rohlf. 1996. A glossary for geometric morphometrics. In L. F. Marcus, M. Corti, A. Loy, G. J. P. Naylor and D. E. Slice (eds.), *Advances in Morphometrics*, pp. 531–551. Plenum, N.Y.). Often this information is represented as a matrix of the coordinates of points, called landmarks, that are presumed to capture the shape of the structure and to be homologous across specimens within a study. Such raw data cannot be analyzed directly since the values of the coordinates are a function of the location and orientation of the specimen, with respect to the digitizing device, at the time the data were collected. Geometric morphometric analyses register all specimens to a common coordinate system to remove such effects. This variation is usually further decomposed into components of size and shape differences.

Specifically, let $X_i$ be a p×k matrix of the k coordinates of the p landmarks describing the shape of the ith specimen. The prior art geometric morphometric analysis of such data usually begins by fitting the model:

$$X'_i = \alpha_i(X_C + D_i)H_i + 1\tau_i$$

where $\alpha_i$ is a scalar scale factor, $H_i$ is an orthonormal k×k rotation matrix, 1 is a p×1 vector of 1s, $\tau_i$ is a 1×k vector of translation terms, and $D_i$ is a p×k matrix of deviations from a p×k consensus configuration $X_C$. The parameters of the model are estimated for each specimen so as to minimize the trace of $(X'_i-X_C)'(X'_i-X_C)$ subject to the constraints that $X'^t_i 1=0$, where 0 is a k×1 vector of 0s, and $tr(X'^t_i X'_i)=1$. The constraints simply mean that each $X'_i$ is centered at the origin and that the sum of squared distances of the landmarks from the origin equals unity. The criterion being minimized is the sum of squared Euclidean distances from each landmark on $X'_i$ to the corresponding landmark on $X_C$. Since $X_C$ is unknown, it and the parameters of the model are estimated by an iterative process using one of the $X_i$ as an initial estimate of $X_C$ (See, Gower, J. C. 1975. Generalized Procrustes analysis. *Psychometrika*, 40:33–51; and Rohlf, F. J., and D. E. Slice. 1990. Extensions of the Procrustes method for the optimal superimposition of landmarks. *Systematic Zoology*, 39:40–59).

The original data required pk parameters to represent variation in each of the k coordinates at each of the p points in a configuration. The fitting and associated constraints, however, impose a certain structure on the data that cannot be ignored during subsequent analyses. One degree of freedom in the sample variation is lost due to the estimation of the scale parameter, k degrees of freedom are lost due to translation, and k(k−1)/2 due to rotation. Though the superimposed data are still represented by pk values, their variation has, at most, pk−k−k(k−1)/2−1 degrees of freedom. Furthermore, this reduced shape space is non-Euclidean (See, Kendall, D. G. 1984. Shape manifolds, Procrustean metrics, and complex projective spaces. *Bull. Lond. Math. Soc.*, 16:81–121; and Kendall, D. G. 1985. Exact distributions for shapes of random triangles in convex sets. *Adv. Appl. Probab.*, 17:308–329), i.e. it is curved, thus precluding the direct application of standard linear statistical analyses. To address the latter problem, data are usually projected into a linear space tangent to shape space at the point of $X_C$. Such an operation provides the best linear approximation to the curved shape space (See, Rohlf, F. J. 1996. Morphometric spaces, shape components, and the effects of linear transformations. In L. F. Marcus, M. Corti, A. Loy, G. J. P. Naylor and D. E. Slice (eds.), *Advances in Morphometrics*, pp. 117–129. Plenum, N.Y.).

A collection of triangles in two dimensions provides a simple, low-dimensional example. Each triangle can be completely described by the x,y coordinates of its three vertices and represented as a point in a p×k=2×3=6 dimensional space of all triangles. Superimposing the sample on their mean configuration using the above procedure results in a loss of k−k(k−1)/2−1=4 degrees of freedom, leaving two degrees of freedom for shape variation. For triangles, this curving 2D space embedded within the original six dimensional space can be visualized as the surface of a hemisphere centered at the origin. For small amounts of variation, the projection of the scatter onto a tangent plane touching the surface of this hemisphere at the point representing $X_C$ can be used as a linear approximation of the variation in shape space. Such an approximation of a curving surface by a planar one is analogous to using points on a flat map to represent positions on the curving surface of the earth. For configurations of more 2D points, shape space is a complex (p−2)-torus. The situation for configurations of higher dimension is comparable, but the structure of the shape space and the associated mathematics are much more complicated (See, Goodall, C. R. 1992. Shape and image analysis for industry and medicine. Short course. University of Leeds, Leeds, UK).

Geometric morphometrics provides a sophisticated suite of methods for the processing and analysis of shape data (see, Bookstein, F. L. 1991. *Morphometric Tools for Landmark Data. Geometry and Biology.* Cambridge University Press, New York; Rohlf, F. J., and L. F. Marcus. 1993. A revolution in morphometrics. *Trends in Ecology and Evolution*, 8:129–132; and Marcus, L. F., and M. Corti. 1996. Overview of the new, or geometric morphometrics. In L. F. Marcus, M. Corti, A. Loy, G. J. P. Naylor and D. E. Slice (eds.), *Advances in Morphometrics*, pp. 1–13. Plenum, N. Y.). Most geometric morphometric analyses to date have been oriented toward assessing group differences and the covariation of shape with extrinsic variables (see Marcus, L. F., M. Corti, A. Loy, G. J. P. Naylor, and D. E. Slice. 1996. Advances in Morphometrics, *NATO ASI Series A: Life Sciences*, pp. xiv+587. Plenum Press, N.Y. for numerous examples). For many questions, though, such "static" analyses are inadequate. The study of feeding, flying, walking, swinging, or swimming, for instance, require methods capable of characterizing dynamic, repetitive changes in the shape of a single set of structures within each specimen.

For practical applications, complex motions involving many landmarks can be analyzed. However, a simple data set can be used to illustrate the inadequacy of standard methods and the efficacy of the new procedure for the analysis of motion-related shape change.

Figure 1A:
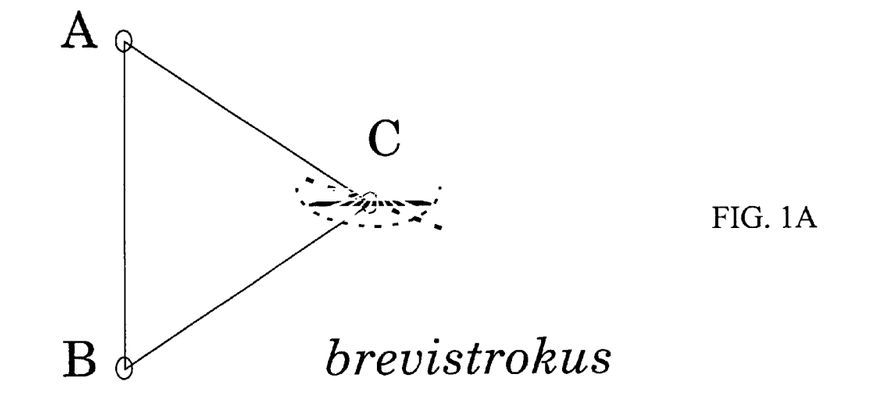
FIGS. 1A–1C illustrate basic configurations used to model motion-driven shape changes, wherein triangular configurations are defined by points ABC (light solid lines), heavy solid lines indicate the motion of point C relative to AB for the model specimen, and dotted lines show deviations from the model specimen used to simulate individual variation.
Figure 1B:
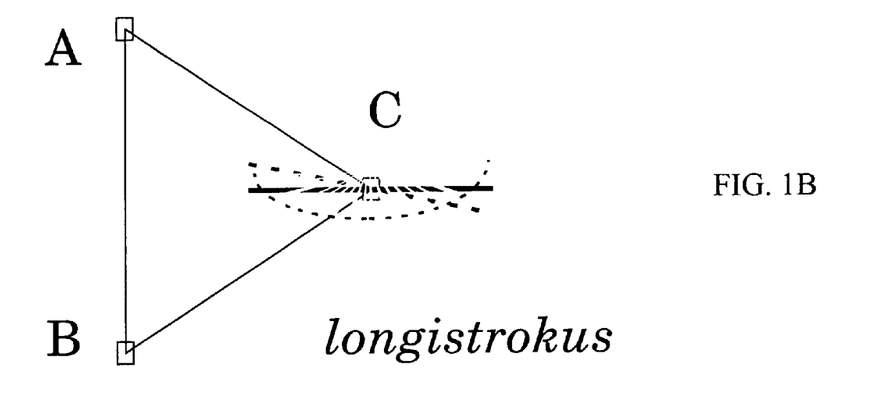
Figure 1C:
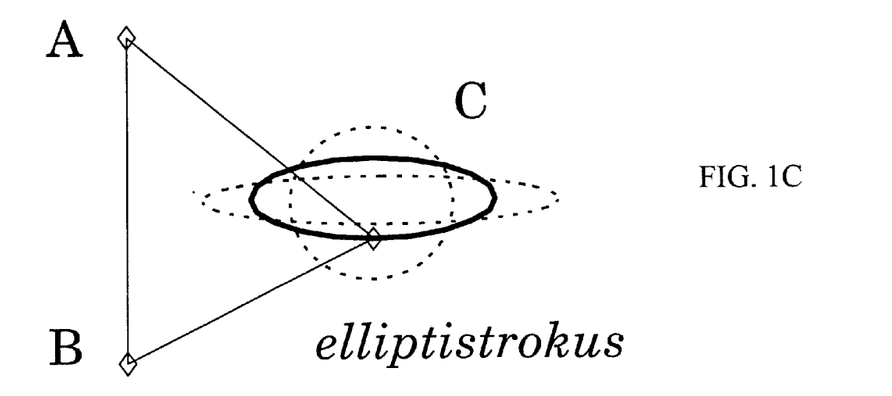

FIGS. 1A–1C show triangular configurations associated with three individuals of three hypothetical "species" used to model the changes in the relative locations of points associated with a particular motion. It is hypothesized that during the course of the motion, point C moves with respect to points A and B. Which points move is irrelevant in shape analysis, and, in fact, cannot be determined from the shape differences alone.

In the species *brevistrokus*, shown in FIG. 1A, the "idealized" motion has point C moving a short distance back and forth at a right angle to the line segment connecting points A and B. In the second species, *longistrokus*, shown in FIG. 1B, point C moves in approximately the same direction, but the range of motion is twice that of *brevistrokus*. In the last species, *elliptistrokus*, shown in FIG. 1C, the motion of point C is in the same general direction as in the other two species, but follows an elliptical path. The individual in the sample expressing the idealized motions for a species is referred to as the "model" specimen.

Slight deviations in the idealized motions just described were drawn by hand to simulate individual variation within a species (dotted lines in FIGS. 1A–1C). For the two species expressing linear motion in point C (*brevistrokus* and *longistrokus*), one individual was constructed with a slightly curving deviation from the idealized motion and another with a slightly angular deviation. For *elliptistrokus*, one individual was constructed with a longer, narrower elliptical stroke than ideal and one with a shorter, fatter stroke.

To generate data for analysis, a drawing of each individual is digitized three times at ten points within one realization of the hypothetical motion. For each set of ten digitized configurations, care is taken to ensure that all ten configurations are in sequence with respect to the cycle of motion, however, the starting point within the motion is varied slightly. Otherwise, digitizing is done with intentional imprecision to introduce additional variation due to measurement error. This process results in a data set of 270 individual configurations representing ten configurations taken from three replicate motions of three individuals from each of the three hypothetical species.

Figure 2A:
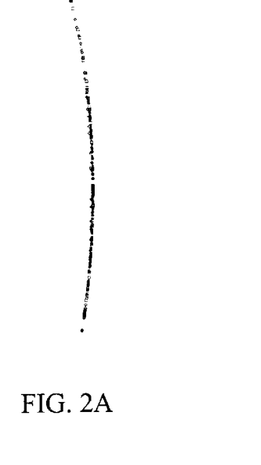
Figure 2B:
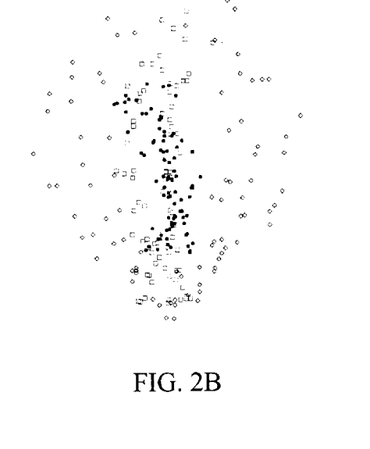

The data is first superimposed by generalized least-squares superimposition (GLS) method using Morpheus et al. (See, Slice, D. E. 1998. Morpheus et al.: Software for Morphometric Research. Revision 01-30-98. Department of Ecology and Evolution, State University of New York at Stony Brook, Stony Brook, N.Y.). As described previously, this mapped the six-dimensional data into a two-dimensional subspace. That this space is curved, rather than a plane, is evidenced by the results of a singular value decomposition (a short cut to a principal components analysis) of the mean-centered superimposed data matrix carried out using NTSYSpc (See, Rohlf, F. J. 1997. NTSYS-pc: Numerical Taxonomy and Multivariate Analysis System. Exeter Software, Setauket, N.Y.). Three of the principal component (PC) axes were associated with nonzero variation in the superimposed sample instead of two as would be expected for planar variation. Projections of the data onto these axes are shown in FIGS. 2A and 2B, where FIG. 2A shows the data plotted on axes associated with the largest and smallest nonzero sample variation. FIG. 2B shows the data plotted with respect to axes associated with the largest and second largest amount variation. FIG. 2A is an edge-on view of the subspace revealing its curvature. FIG. 2B is a tangent space approximation of the scatter in the curved subspace.

For this data, the application of standard exploratory methods fail to provide the desired results. A UPGMA clustering of all 270 configurations, for instance, showed no structure indicative of the true relationships between the configurations. Neither did the UPGMA clustering of mean shapes of individual replicate motions reflect the known structure within the sample. Even replicates of some individuals in the latter analysis were indicated as being quite distinct, with no discernable pattern suggesting a possible explanation.

These results illustrate the need for the incorporation of known information about the relationships of configurations to the motion into the analysis of this type of data.

SUMMARY OF THE INVENTION

To overcome the disadvantages of the motion analysis methods of the prior art, the present invention provides a geometric method for the analysis of shape changes resulting from repetitive motions, such as those that arise in studies of swimming, walking, jumping, or feeding. Specifically, a multivariate extension of Elliptic Fourier Analysis (EFA) (See, Kuhl, F. P., and C. R. Giardina. 1982. Elliptic Fourier features of a closed contour. *Computer Graphics and Image Processing*, 18:236–258; and Ferson, S., F. J. Rohlf, and R. K. Koehn. 1985. Measuring shape variation of two-dimensional outlines. *Syst. Zool.*, 34:59–68), usually used in the analysis of outlines, for use in characterizing motion-driven shape changes is provided. The methods of the present invention represent an advancement of geometric morphometrics at a very fundamental level. They extend the current geometric methods for the analysis of scatters of individual shapes in shape space to allow for the analysis of scatters of sets of shapes in "trajectory" or motion space.

The multivariate extension of Elliptic Fourier Analysis (EFA) (Kuhl and Giardina, 1982, supra; Ferson et al., 1985, supra), usually used in the analysis of outlines, can address the problem of characterizing motion-driven shape changes. Specifically, the present invention utilizes EFA to parameterize trajectories through shape space resulting from motion. This maps sets of configurations along trajectories to single points in "trajectory space" that can be used to compare, test, and summarize samples of such trajectories.

Figure 3A:
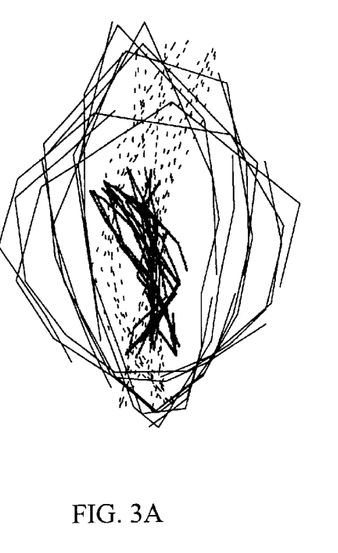
Figure 3B:
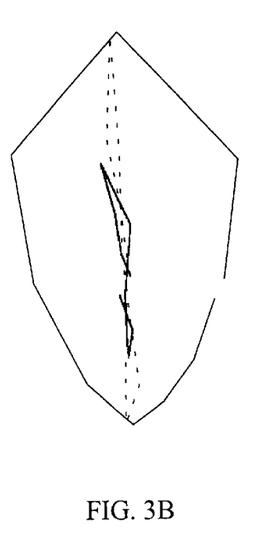
Figure 3C:
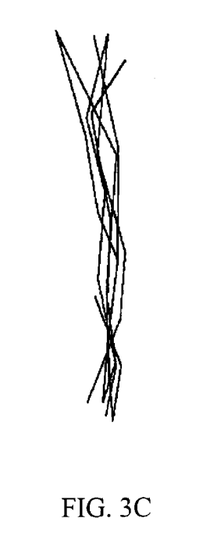

A useful approach to solving the problems of the prior art can be found in the use of Elliptic Fourier Analysis (EFA) to model the trajectories of shape changes resulting from repetitive motions. That such an approach is reasonable is illustrated in FIGS. 3A–3C, where the configurations of points connected sequentially throughout single replicates of the hypothetical motion have been joined to form the shape trajectories. FIG. 3A shows all twenty-seven trajectories in the test data discussed above with reference to FIGS. 1A–1C and 2A–2B. For clarity, FIG. 3B shows single trajectories for the model individual of each species of FIGS. 1A–1C and 2A–2B. FIG. 3C illustrates individual variation in shape trajectory for three replicates of the model specimen of *brevistrokus* of FIG. 1A. Gaps in the trajectories are between the first and last points (unlabeled) collected in the motion cycle. Full periodicity of the shape change, where the shapes of the starting and ending configurations are coincident, is not mandatory, but a useful initial model.

Accordingly, a method for geometrically analyzing motion is provided. The method comprising the steps of: choosing a set of points having at least three individual points to define a single realization of a motion; sequentially collecting Cartesian coordinates of the set of points at different times during the motion from a start point to an end point; treating the collection of sets of points as a sample of the motion; and transforming the sets of points at the different times to a common coordinate system thereby defining a trajectory of the motion.

In a preferred implementation of the method of the present invention, the method further comprises the steps of:

choosing a set of points having at least three individual points to define a single realization of a motion; sequentially collecting Cartesian coordinates of the set of points at different times during the motion from a start point to an end point; treating the collection of sets of points as a sample of the motion; transforming the sets of points at the different times to a common coordinate system thereby defining a trajectory of the motion; and calculating elliptic Fourier coefficients describing the trajectory of the motion independent of any difference in the spacing of the different times.

BRIEF DESCRIPTION OF THE DRAWINGS

These and other features, aspects, and advantages of the methods of the present invention will become better understood with regard to the following description, appended claims, and accompanying drawings where:

FIGS. 2A and 2B illustrate plots of test data in the space of least-squares superimposed triangles, wherein each point represents an original triangular configuration, FIG. 2A illustrates a side view showing the curvature of shape space, FIG. 2B illustrates a view orthogonal to PC axes associated with the greatest amount of sample variation, circles denote *brevistrokus*, squares denote *longistrokus*, and diamonds denote *elliptistrokus*.

FIGS. 3A–3C illustrate original shape data shown as motion-generated trajectories, wherein FIG. 3A illustrates 27 trajectories from three replicates of three individuals of the three species of FIGS. 1A–1C, FIG. 3B illustrates representative trajectories of a single replicate from the model individual of each of the species of FIGS. 1A–1C, FIG. 3C illustrates replicate trajectories of the model individual of *brevistrokus* of FIG. 1A, gaps in trajectories are between starting and ending configurations, light solid lines denote *elliptistrokus*, dotted lines denote *longistrokus*, and heavy solid lines denote *brevistrokus*.

FIGS. 4A–4C illustrate EFA reconstructed shape trajectories, wherein FIG. 4A shows all 27 trajectories from three replicates of three individuals of the three species of FIGS. 1A–1C, FIG. 4B illustrates representative reconstructed trajectories of a single replicate from the model individual of each of the species of FIGS. 1A–1C, FIG. 4C illustrates reconstructed replicate trajectories of the model individual of *brevistrokus* of FIG. 1A, gaps in trajectories are between starting and ending configurations, light solid lines denote *elliptistrokus*, dotted lines denote *longistrokus*, and heavy solid lines denote *brevistrokus*.

FIG. 5 illustrates a UPGMA clustering of shape trajectories. Labels therein are of the form si.j, wherein s indicates "species" (B=*brevistrbkus*, L=*longistrokus*, E=*elliptistrokus*), i indicates individual, and j indicates replicate.

DETAILED DESCRIPTION OF THE PREFERRED EMBODIMENTS

Before discussing the method of the present invention in detail, a brief overview of Elliptic Fourier Analysis (EFA) is presented. EFA is one of a number of methods available for the analysis of curves and outlines (See, Rohlf, F. J. 1990. Fitting curves to outlines. In F. J. Rohlf and F. L. Bookstein (eds.), *Proceedings of the Michigan Morphometrics Workshop.*, Vol. Museum of Zoology special publication no. 2, pp. 167–177. University of Michigan, Ann Arbor). Unlike many other methods, though, EFA does not require the data to be represented by a single-valued function or that the sampled points be evenly spaced and can accurately parameterize arbitrarily complex curves. EFA provides a direct procedure for obtaining Fourier coefficients that can reconstruct any set of sequential, but arbitrarily spaced, 2- or 3D points, avoids the use of the Fast Fourier Transform, and provides optional standardizations for size, location, and orientation.

Technically, EFA computes separate Fourier series expansions of projections of an outline on the x and y axes:

$$x(t) = A_0 + \sum_{n=1}^{\infty}\left(a_n \cos\frac{2n\pi}{T} + b_n \sin\frac{2n\pi}{T}\right)$$

$$y(t) = C_0 + \sum_{n=1}^{\infty}\left(c_n \cos\frac{2n\pi}{T} + d_n \sin\frac{2n\pi}{T}\right)$$

where t is the distance along the contour, and T is the total length of the contour. For a contour of K points, $$A_0 = \frac{1}{T}\sum_{p=1}^{K}\frac{\Delta x_p}{2\Delta t_p}(t_p^2 - t_{p-1}^2) + \sum_{j=1}^{p-1}\Delta x_j - \frac{\Delta x_p}{\Delta t_p}\sum_{j=1}^{p-1}\Delta t_j,$$

$$a_n = \frac{T}{2n^2\pi^2}\sum_{p=1}^{K}\frac{\Delta x_p}{\Delta t_p}\left[\cos\frac{2n\pi t_p}{T} - \cos\frac{2n\pi t_{p-1}}{T}\right],$$

-continued $$b_n = \frac{T}{2n^2\pi^2} \sum_{p=1}^{K} \frac{\Delta x_p}{\Delta t_p} \left[ \sin\frac{2n\pi_p}{T} - \sin\frac{2n\pi_{p-1}}{T} \right],$$

$$C_0 = \frac{1}{T} \sum_{p=1}^{K} \frac{\Delta y_p}{2\Delta t_p} (t_p^2 - t_{p-1}^2) + \sum_{j=1}^{p-1} \Delta y_j - \frac{\Delta y_p}{\Delta t_p} \sum_{j=1}^{p-1} \Delta t_j,$$

$$c_n = \frac{T}{2n^2\pi^2} \sum_{p=1}^{K} \frac{\Delta y_p}{\Delta t_p} \left[ \cos\frac{2n\pi_p}{T} - \cos\frac{2n\pi_{p-1}}{T} \right],$$

$$d_n = \frac{T}{2n^2\pi^2} \sum_{p=1}^{K} \frac{\Delta y_p}{\Delta t_p} \left[ \sin\frac{2n\pi_p}{T} - \sin\frac{2n\pi_{p-1}}{T} \right].$$

The statistical comparison of EFA-parameterized outlines, like that of landmark configurations, requires their standardization with respect to location and spatial orientation. Also, it is usually desirable to partition the remaining variation into components due to scale and shape differences. In EFA these standardizations are achieved by first rotating the starting point of each reconstruction around the outline through an angle, $\theta_1$, so that the starting point is aligned with one end of the semimajor axis of the ellipse described by the first harmonic. Next, the outlines are rotated through an angle, $\psi_1$, to align the semimajor axis with the x-axis of the coordinate system. And finally, all coefficients are divided by the magnitude of the first semimajor axis, $E^*(0)$. These transformations are applied directly to the Fourier coefficients:

$$\begin{bmatrix} a_n^* & b_n^* \\ c_n^* & d_n^* \end{bmatrix} = \begin{bmatrix} a_n & b_n \\ c_n & d_n \end{bmatrix} \begin{bmatrix} \cos n\theta_1 & -\sin n\theta_1 \\ \sin n\theta_1 & \cos n\theta_1 \end{bmatrix},$$

$$\begin{bmatrix} a_n^{} & b_n^{} \\ c_n^{} & d_n^{} \end{bmatrix} = \frac{1}{E^*(0)} \begin{bmatrix} \cos\psi_1 & \sin\psi_1 \\ -\sin\psi_1 & \cos\psi_1 \end{bmatrix} \begin{bmatrix} a_n^* & b_n^* \\ c_n^* & d_n^* \end{bmatrix},$$

where $$\theta_1 = \frac{1}{2} \arctan\left[ \frac{2(a_1 b_1 + c_1 d_1)}{a_1^2 + c_1^2 - b_1^2 - d_1^2} \right],$$

$$\psi_1 = \arctan\frac{c_1^*}{a_1^*},$$

and $$E^*(0) = (a_1^{*2} + c_1^{*2})^{\frac{1}{2}}.$$

The starting point and orientation standardizations do not work for circular outlines since the major axis of a circle is undefined. Such situations require the starting point and orientation be user-specified.

The application of EFA to shape trajectories raises certain issues that either do not usually arise in the analysis of outlines or should be handled differently. For instance, one is most often interested in standardizing outlines with respect to sense (clockwise/counterclockwise rotation). This is probably not the case for shape trajectories. It is of biological interest, for example, if some individuals of *elliptistrokus* in the test data presented above perform the motion in a clockwise manner while others move in a counterclockwise direction. Also, since shape trajectories are already registered within the coordinate system of shape or tangent space one would not want to automatically factor out location, orientation, and size as is usually done with outlines. Such characteristics could provide insights into the biology of observed differences, and should be retained and tested separately.

EFA Analysis of Motion-driven Shape Change

Figure 4A:
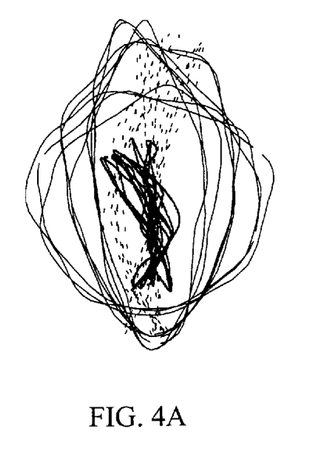
Figure 4B:
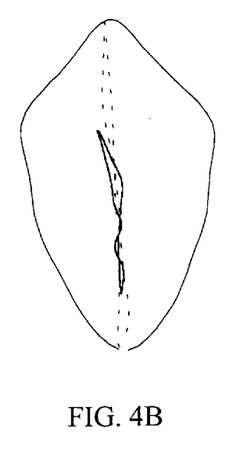
Figure 4C:
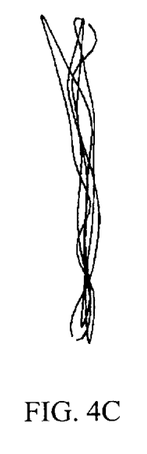

The simplicity of the sample data presented previously (triangular configurations whose shapes map to points in a 2D tangent space) allows one to test the EFA modeling of shape trajectories using existing Fourier routines in NTSYSpc. Trajectories are standardized with respect to starting point to synchronize the individual motions. They are not standardized for location or orientation since, as previously discussed, they are within the same coordinate system (that of the tangent space). The results are shown in FIGS. 4A–4C, which illustrate the EFA-reconstructed trajectories for the original data shown in FIGS. 3A–3C. The estimated trajectories are smoother, but otherwise faithful, reconstructions of the original data up to rounding error. Again the gaps are between the first and last points in the reconstructed trajectory, but have shifted due to the synchronization operation.

Figure 5:
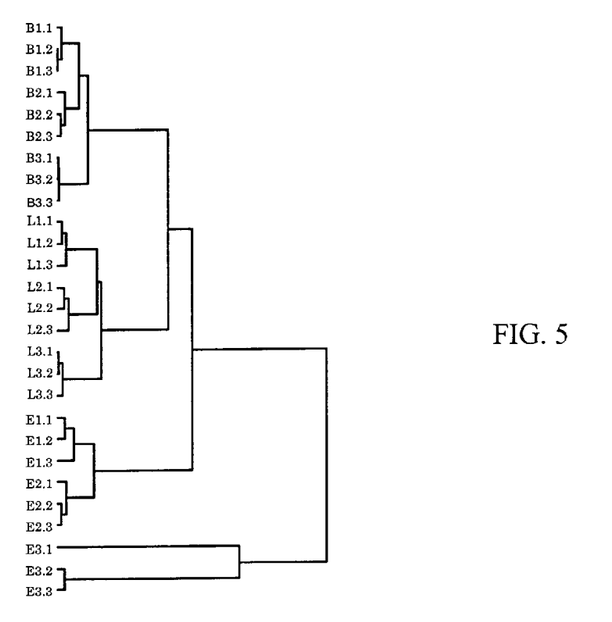

The potential of this approach for modeling shape trajectories can be seen in the results of UPGMA clustering of the trajectories shown in FIG. 5. These results are based on the clustering of EFA coefficients that capture the entire trajectory. Replicates of individuals are all identified as being most similar, and individuals within a species are grouped together. The less clear result for the third individual of *elliptistrokus* is due to the nearly circular nature of its trajectory, and hence ambiguity as to the orientation of its major axis. Such situations could be flagged in software by calculating an index of eccentricity. Preferably, in practical applications of the method of the present invention, users could be required to manually synchronize shape trajectories by collecting data from a specific point within a motion and forgoing the automatic starting-point standardization.

EFA is easily generalized to allow for its application to the analysis of shape trajectories in high-dimensional shape space. The standard EFA computations for estimating Fourier coefficients for outlines model changes in coordinate as a function of distance along an outline separately for each coordinate axis. The extension of these equations to higher dimensional shape spaces is straightforward requiring only the additional, independent computation of coefficients for each, i.e. substituting $\Delta x_{ip}$ of the ith coordinate for the explicit $\Delta x_p$ and $\Delta y_p$ in the earlier equations. Similar extensions are possible for the starting-point standardizations. More subtlety is required for the usual orientation and size standardization used in 2D EFA, since they assume a basic model of an ellipse in a plane. The use of the principal components axes (for orientation) and the centroid size (for size) of detailed reconstruction can also be utilized to address these issues.

Analytical and visualization methods for use with this technique can also be used. For example, the trajectories represented in FIGS. 4A–4C are trajectories through tangent space and each point along them represents a shape in physical space. Thus, one can draw a picture of any shape along any trajectory or create animations of entire trajectories, or perhaps, differences between trajectories. The preferred method for such visualizations would depend upon the data. For small variation in shape due to motion, animated thin-plate splines (Bookstein, 1991, supra) in 2- or 3D are preferred. Other sorts of data or shape changes might be better represented by simple plots of landmark trajectories drawn on an average configuration or animated "stick figures". Finally, one could use the thin-plate spline function to map from any point along the trajectory to the space of original data observations. This would mean that if the original data were associated with an image, images could be averaged to produce a composite image at any point on the trajectory. More specifically, at points $t_j$ along part of a reconstructed or average trajectory between original data points $t_i$ and $t_{i+1}$, each of which was associated with a registered image, points in the physical space around $t_j$ could be mapped into the physical space of $t_i$ and $t_{i+1}$ using the thin-plate spline, and the pixel values at those locations in each of the original images can be averaged (weighted by distance along the trajectory) and assigned to points around the interpolated configuration. In this way, a series of interpolated images could be constructed along a trajectory to produce a video of the trajectory. This methodology, called unwarping, has been implemented in TPSSUPER (See, Rohlf, F. J. 1997b. TPSSUPER. Superimposition and image averaging. Department of Ecology and Evolution, State University of New York at Stony Brook, Stony Brook, N.Y.) and edgewarp (See, Green, W. D. K., and F. L. Bookstein. 1995. Edgewarp: Implementation of the thin-plate spline in two dimensions. Center for Human Growth and Development, University of Michigan, Ann Arbor), which can average pairs or sets images, but has not been used to visualize dynamic shape changes. All of the methods of the present invention, as well as the methods of visualization can be implemented and tested in software.

It is worth emphasizing that the proposed methods are all geometrical, not statistical. That is, up to the point of statistical summary or use of the Fourier methods for data reduction there is no loss of information from the original, raw data. That information is simply partitioned into geometrically orthogonal components, e.g. location, orientation, size, shape trajectory parameters, that can be either disregarded as nuisance parameters, e.g. location, or incorporated into a final analysis, e.g. shape trajectory orientation. At any point throughout an analysis, measures that have been traditionally used to characterize motion can be derived. For less well known biological systems, the proposed methods will provide a means for comprehensive exploratory analysis that could suggest simpler summary measures useful for comparison or further investigation.

One of Kendall's important results is that for p points in two dimensions, the shape space arising from the Procrustes metric is isometric to a complex projective space, $CP^{p-2}$, and, in the special case of triangles, is isometric to a 2-sphere of radius ½. Practical applications of geometric morphometrics, however, generally employ Generalized Procrustes Analysis (GPA)(Grower, supra) to superimpose samples of point configurations onto a reference (usually the sample mean) instead of the pair-wise optimization considered by Kendall. AS will be discussed below, the method of the present invention preferably maps shapes onto a (hyper) hemisphere of radius 1. However, the mapping of shapes onto Kendall's space shape is also contemplated by the present invention. The hemisphere of GPA-aligned shapes is the preferred space from which to work when projecting samples into a linear tangent space for subsequent statistical analysis (Rohlf, 1990, supra). Examples are provided for triangles which allow accurate graphical depictions of the various shape spaces in 2 or 3 dimensions.

As discussed above, the field of geometric morphometrics is concerned with methods for studying shapes of objects. Central to these methods is the definition of shape as the geometric properties of an object that are invariant to location, orientation, and scale Slice et al., 1996, supra). Current geometric morphometric methods mostly involve the analysis of the Cartesian coordinates of configurations of landmarks (points) that could serve as endpoints for measurements used in more traditional approaches to shape analysis, such as the comparison of ratios of linear distances or of angles between vectors connecting the landmarks. The geometric methods are distinguished from the more traditional morphometric analyses by their strictly-enforced retention of all the geometric information in the landmark coordinates of each configuration.

The constraints imposed by partitioning total coordinate variation into shape and non-shape components can lead to well-defined topological and geometric constraints on the resulting shape variation. Kendall showed that a specific metric, Procrustes distance, leads to a shape space for planar triangles that is isometric with the 2-sphere of radius ½.

The most commonly used procedure employed for removing differences in location, scale, and orientation, Generalized Procrustes Analysis (GPA), leads not to Kendall's shape space, but to a space that is a (hyper)hemisphere of radius one. In the case of planar triangles, this space has a simple geometric relationship to Kendall's shape space. Furthermore, recent studies suggest that when shape variation is linearized by projection into a tangent space for the purpose of statistical analyses, the hemisphere of GPA-aligned configurations is the preferred space from which to work.

As discussed briefly above, Kendall removed location and size differences between sets of point coordinates by translating and scaling each configuration so that $$X'1 \times 0 \text{ and } tr(XX^t)=1,$$

where X is a p×k matrix of the coordinates of p points in k dimensions, 1 is a p×1 vector of 1s, and 0 a k×1 vector of 0s. The first contraint simply expresses the centering of each configuration at the origin. The second constraint indicates the scaling of each configuration to unit "size," where size is defined as the sum of squared, Euclidean distances from each landmark to the configuration centroid. The square root of this value is called Centroid Size (Bookstein, 1991, supra).

Kendall then accounted for orientation by "quotienting-out" special orthogonal rotations from the centered, scaled configurations to form an equivalence class of shapes. This was done by minimizing the great circle distance, d, between each pair of centered, scaled configurations when considered as 1×pk vectors:

$$\rho(\sigma^1, \sigma^2) = \inf_R \ d(RX_1', X_2')$$

where R is a 2×2 special, orthogonal rotation matrix and the primes denote centered and scaled matrices of landmark coordinates. In the above equation, $\rho$ is the Procrustes angular (=great circle) distance (see below) between the two shapes, $\sigma^1$ and $\sigma^2$, and provides a metric for their comparison. The Procrustes distance $\rho$ has a maximal value of $\pi/2$ and defines Kendall's shape space, $\Sigma_k^p$, for configurations of p points in k dimensions.

The dimensionality of the sample space of p points in k physical dimensions is, of course, pk Standardization for location, scale, and orientation reduce the potential dimensionality of the variation of the data by k, 1, and k(k−1)/2, respectively. This contributes to Kendall's result that for k=2, shape space is isometric to the complex projective space, $CP^{p-2}$. In the special case of planar triangles, $\Sigma_2^3$ is isometric to a 2-sphere of radius ½.

Figure 6A:
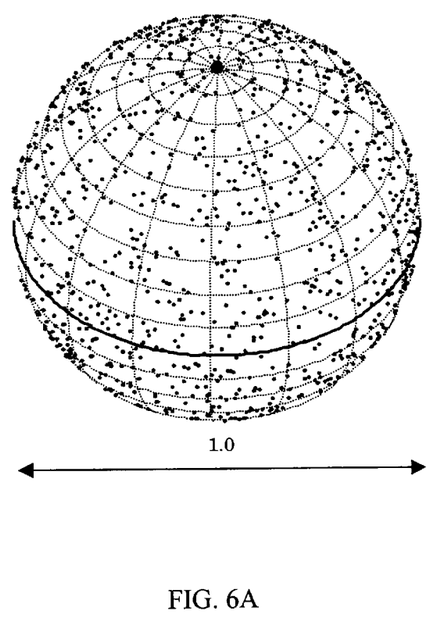
FIG. 6A illustrates a sample of 2000 random triangles mapped as points on the surface of a sphere.

FIG. 6A shows a sample of 2000 random triangles mapped as points on the surface of a sphere. The sphere, in this case, has been oriented so that the north pole represents the shape of an equilateral triangle. The reflection of this triangle maps to the south pole, and those triangles having collinear vertices lie along the equator. Great circle distances between points equal the Procrustes angular distances between corresponding shapes. This plot also illustrates Kendall's result that triangles generated by IID, Gaussian displacement of triplets of points from the origin will have a uniform distribution in $\Sigma_2^3$.

Figure 6B:
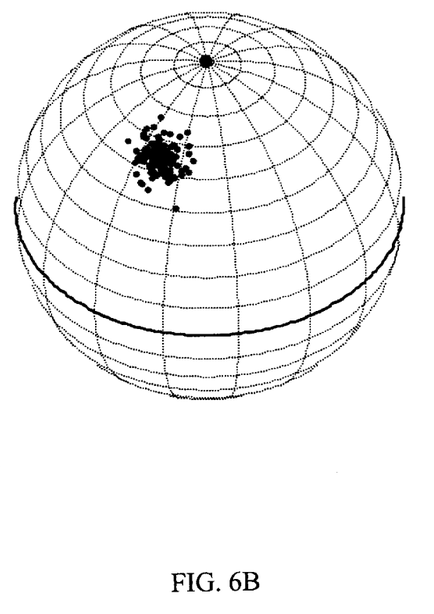
FIG. 6B illustrates the sphere of FIG. 6A onto which has been mapped a mixed sample (both sexes from two subspecies) of 110 triangles formed by the extremal angles of gorilla scapulae.

FIG. 6B shows the same sphere onto which has been mapped a mixed sample (both sexes from two subspecies) of 110 triangles formed by the extremal angles of gorilla scapulae (See, Taylor, A. B. (1997) Scapula form and biomechanics in gorillas. *J. Hum. Evol.* 33, 529–553). This plot is consistent with the important observation that for most biologically derived material the actual amount of shape variation occupies a relatively small patch of shape space.

Kendall's development of shape theory is based on the Procrustes metric between pairs of configurations. A convergent approach, and the one used in practical applications of geometric morphometrics, is based on the least-squares superimposition (Ordinary Procrustes Analysis or OPA) of landmark configurations. That is, given the model:

$$X_2 = \alpha(X_1 + D)H + 1\tau,$$

where $\alpha$ is a scale factor, H is a k×k special, orthogonal (no reflections) rotation matrix, 1 is a k×1 vector of 1s, $\tau$ is a k×1 vector of coordinate-wise translations, and D is a p×k matrix of shape difference between the two configurations, the translation and rotation parameters are computed to minimize the sum of squared distances between corresponding landmarks in the two configurations: $\Delta^2 = \text{tr}(DD')$.

The scale factor, $\alpha$, can be computed so as to scale each object to a specific, usually unit, centroid size, as in Kendall's work. Such a choice for $\alpha$ does not, however, minimize $\Delta^2$. That is achieved by scaling the specimen to $\cos(\rho)$, where $\rho$ is the angle between the two centered and aligned configurations written as 1×pk vectors, i.e., the Procrustes angular distance. The difference between these scalings has not always been emphasized in morphometric literature and software, though Goodall (supra) and Kent (Kent, J. T. (1994) The complex Bingham distribution and shape analysis. *J. R. Statist. Soc. B.* 56(2), 285–299) make the distinction between partial (unit centroid-size scaling) and full (criterion-minimizing scaling) Procrustes analyses. Scaling to unit centroid size is the scaling employed by Kendall and parallels the approach used in other morphometric analyses with the intent of comparing specimens at a standard size, e.g., dividing measurements by the cube root of body weight or a specified linear dimension (See, Jungers, W. L., Falsetti, A. B., & Wall, C. E. (1995) Shape, relative size, and size adjustments in morphometrics. *Yearbook of Physical Anthropology* 38, 137–161).

The criterion $\Delta^2$ is a measure of the shape difference between two landmark configurations. The square root of this quantity has also been referred to as Procrustes distance (See, Bookstein, F. L. (1996) in *Advances in Morphometrics*, eds. Marcus, L. F., Corti, M., Loy, A., Naylor, G. J. P., & Slice, D. E. (Plenum, USA), pp. 131–151.). With unit centroid size scaling, this formulation and the great circle distance used by Kendall are simply related by $\rho = 2\sin^{-1}(\Delta/2)$. These two distances can be distinguished as Procrustes chord distance and Procrustes angular distance (See, Dryden, I. L. & Mardia, K. V. (1998) *Statistical shape analysis*, John Wiley & Sons, New York), respectively. This convention will be followed herein when the distinction is important. Otherwise, both will be synonymized as Procrustes distance.

The OPA superimposition addresses pair-wise differences between two configurations. In most practical applications, one is concerned with the analysis of samples of more than two configurations. In such cases, one can fit the individual configurations to a specified reference configuration or, more reasonably (see below), compute a mean configuration and compare samples to it. The latter is referred to as a Generalized Procrustes Analysis (GPA) (Grower, 1975, supra) or a Generalized Least Squares (GLS) superimposition (Rohlf and Slice, 1990, supra).

Figure 7A:
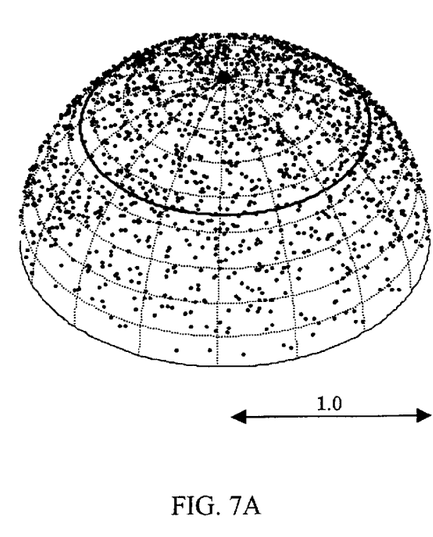
FIG. 7A illustrates a resulting distribution on a hemisphere of the 2000 triangles from FIG. 6A GPA-superimposed onto the equilateral triangle at the north pole of FIG. 6A.
Figure 7B:
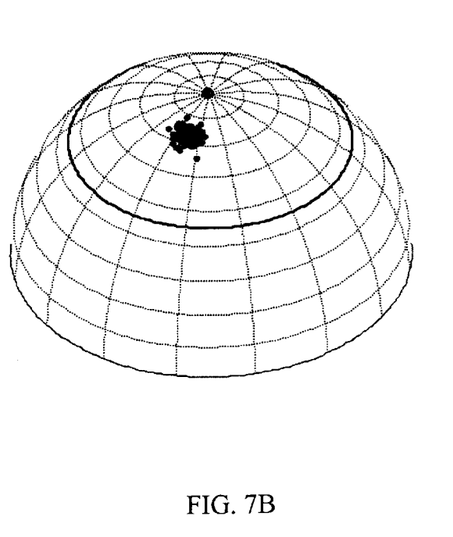
FIG. 7B illustrates the distribution of the similarly superimposed gorilla scapulae from FIG. 6B.

The simultaneous superimposition of configurations to a reference (usually the mean) leads to the geometric properties utilized in the preferred implementation of the method of the present invention. With either an OPA or GPA superimposition the maximum angular distance between centered, optimally-oriented shapes is $\pi/2$ (Kendall, 1984, supra). With unit-centroid scaling, all shapes superimposed in this manner must lie on a (hyper)hemisphere of unit radius and of the same dimension as Kendall's shape space. As in the case of Kendall's shape space, this hemisphere can be easily visualized for planar triangles as shown in FIGS. 7A and 7B. FIG. 7A shows the resulting distribution on the hemisphere of the 2000 triangles from FIG. 6A GPA-superimposed onto the equilateral triangle at the north pole in FIG. 6A. FIG. 7B shows the distribution of the similarly superimposed gorilla scapulae from FIG. 6B.

An important distinction between the mappings of triangles in FIGS. 6A and 6B and 7A and 7B is that great circle distances between all pairs of points correspond to Procrustes angular distance only in Kendall's shape space. The great circle distance between a shape on the hemisphere and the reference used for superimposition equals the Procrustes angular distance between the two, but the distance between any two other shapes does not. This is most dramatically illustrated by the fact that on the hemisphere of triangles, the configuration most different in shape from the reference maps to the entire equator of the hemisphere. Points on opposite sides of the equator are separated by a distance of $\pi/2$ on the hemisphere but have an actual Procrustes distance of zero. However, the hemisphere of the GPA-superimposed triangles can be mapped directly to $\Sigma_2^3$ by scaling each point on the hemisphere by $\cos(\rho)$, where $\rho$ is as defined above. The equator of the hemisphere is at the maximal angular distance of $\pi/2$ from the reference and, thus, is mapped in it's entirety to the south pole of Kendall's shape space.

Kendall's shape space and the GPA (hyper) hemisphere are curved, non-Euclidean spaces. While researchers have provided some distributional results and statistical procedures that account for the geometry of Kendall's shape space (See, Dryden, I. L. & Mardia, K. V. (1998) *Statistical shape analysis*, John Wiley & Sons, New York; Small, C. G. (1996) The statistical theory of shape, Springer, N.Y.), almost all morphometric analyses involve the application of familiar statistical procedures that assume, among other things, distributions in a linear, Euclidean space. This requires an additional linearization step whereby data in either of these non-Euclidean spaces are projected onto a linear subspace of the proper dimension. It is through this step that the geometric differences between the two spaces have the greatest potential impact in applied morphometric studies.

Rohlf (1990, supra) considers several choices of linearization suggested for data in both spaces. Some of these choices are illustrated for triangles in FIG. 8. For Kendall's shape space, one choice of linearization is an orthogonal projection of the data ($X_K$, FIG. 8) onto a plane (in the case of triangles) tangent to Kendall's shape space ($X_{K:ortho}$, FIG. 8). However, this mapping is not single-valued. Points on one side of the equator, defined with respect to the tangent point, are mapped to the same point in the plane as their mirror image across the equator ($X_{K:reflect}$, FIG. 8). It must be emphasized that the two points mapped to the same point in tangent space by this projection are only reflections of each other in Kendall's shape space with respect to the equator as just defined. They are reflections of each other in physical space if, and only if, the tangent point is an equilateral triangle and the equator thus represents triangles with collinear vertices.

Figure 8:
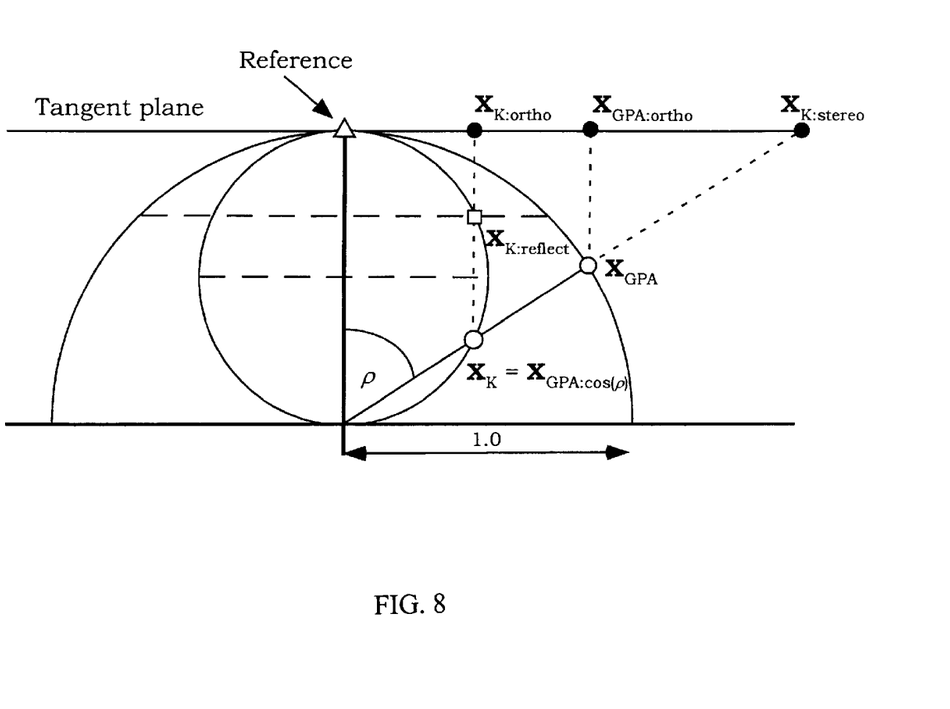
FIG. 8 illustrates the linearization of superimposed triangles such as those shown in FIGS. 6A, 6B, 7A, and 7B.

A second, more reasonable approach is the stereographic projection of the points from Kendall's shape space onto a tangent plane ($X_{K:stereo}$, FIG. 8). Such a projection maps points between the tangent point and the equator, defined with respect to the tangent point, to the area within a circle of radius ½, maps points beyond the equator to the plane outside of this circle, and maps the point antipodal to the tangent point to infinity.

For points on the GPA hemisphere ($X_{GPA}$, FIG. 8), an orthogonal projection provides a unique, one-to-one mapping of points to a disk of unit radius ($X_{GPA:ortho}$, FIG. 8). Note that the $\cos(\rho)$ scaling of GPA-superimposed triangles (and only triangles) exactly maps configurations from the GPA hemisphere to Kendall's shape space ($X_K = X_{GPA:\cos(\rho)}$, FIG. 8).

The usefulness of any of these projections depends upon how accurately Procrustes distances are preserved in the tangent space. Rohlf found that for a variety of data the orthogonal projection of points from the GPA hemisphere more accurately approximated the true (Procrustes) shape distances than either projection from Kendall's shape space. Those results and the general utility of GPA superimpositions suggest orthogonal projection from the GPA hemisphere is the generally preferred linearization.

Still, for small amounts of shape variation, as seen in the gorilla data, the three methods of linearization described above should produce similar results. For the gorilla data, the uncentered correlation between distances in Kendall's shape space and the inter-object distances in the orthogonal and stereographic projections of the points from Kendall's shape space onto a plane tangent at the sample mean is 0.999997 and 1.000000, respectively. The same value for the orthogonal projection from the GPA hemisphere onto a similarly defined plane is 1.000000.

As a final point, one should note that distortions of the distances between objects are increased for points away from the reference. Thus to minimize such distortions, one should use the sample mean configuration as the reference for GPA superimposition and as the point of tangency for any subsequent projections (See, Rohlf, F. J. (1998) On applications of geometric morphometrics to studies of ontogeny and phylogeny. Syst. Biol. 47, 147–158).

The GPA hemisphere and the implications of its geometry for the linearization of shape scatter have not been recognized in previous morphometric work. This is despite the ubiquitous presence of the hemisphere in the analysis of GPA-superimposed data sets. The present invention has focused on shape spaces for planar triangles since it is possible to provide accurate and intuitive graphical representations of the results for such data. For configurations of more landmarks in two dimensions (p>2, k=2), the geometric structure of the GPA (hyper)hemisphere is the same as for triangles except for dimensionality. Similarly, the relationships between various tangent-space projections should be the same for samples with relatively small scatters of shape variation. One noteworthy exception is that the simple relationship between the GPA hemisphere and Kendall's shape space for triangles does not hold for more complicated planar configurations. This is because the equator of the GPA hemisphere then corresponds to a p−3 dimensional complex projective space (Kendall, 1984, supra). Thus, multiple maximally-different shapes would map to the south pole of Kendall's shape space after $\cos(\rho)$ scaling. For $k \geq 3$, the mathematical consideration of Kendall's shape space is much more complicated (Small, 1996, supra). Again, for relatively small amounts of shape scatter the observations presented here should hold.

The method of the present invention has been presented by way of example only as a preferred implementation thereof. However, those skilled in the art would recognize that variations of the method are possible without departing from the scope and spirit of the present invention. Some of these variations include:

1. The present invention has been described with regard to the transformation to a common coordinates system using Generalized Procrustes Analysis, that scales, translates, and rotates(superimposes) the sets of coordinates so as to minimize the sum of squared distances between corresponding (=homologous) points in each configuration and the iteratively computed mean configuration of the sets. This results in the coordinates representing points in the "space of generalized Procrustes aligned configurations." That space is isometric (has the same distance relationships) as a hemisphere for sets of three two-dimensional points, a hyper-hemisphere for more than three two-dimensional points, and an analogous, but more complicated geometric structure for three-dimensional points. However, the transformation to a common coordinate system so as to produce coordinates can also be done in Kendall's shape space. This can be done for two dimensional data using the Reimannian submersion of centered and scaled sets. For three-dimensional data, the same can be done except there may be "singularities," such as those configurations composed of perfectly collinear points, for which the construction does not hold;

2. The transformation to a common coordinates system may include the identity transformation with respect to a prior established, extrinsic coordinate system. For example in the video analysis of a golf swing, the coordinate system could be established by the position of the ball and two other fixed points in the field of view. All data could be captured with respect to these registration points and only the initial size of the golfer would have to be taken into account in subsequent statistical analyses;

3) Similarly, the transformation to a common coordinates system could be established so as to account for a specific direction. For example in the analysis of gait, the transformation would partial out only the horizontal (x) component of movement representing the translation of the specimen resulting from each stride;

4) The common coordinate system representing the position of the specimen in space can be augmented by vectors representing non-spatial variables. For example, standard shape analysis partials out "size" by scaling all shapes to a common, centroid size. The purpose of this is to control for differing initial sizes of the specimens under study. With motion, this notion of size would change for each individual at different parts of the motion. After initial standardization for the size of the individual, the vector of geometric (=centroid) sizes can be appended to the shape coordinates to provide a better, more complete, or more intuitive representation of the motion;

5) Similarly, a "time" vector could be added to the common coordinate system through which such things as velocity and acceleration could be included in the modeling;

6) Once the data is transformed to a common coordinate system, entire motion trajectory plus any augmenting vectors could be parameterized using Elliptical Fourier or similar analysis of the resulting Cartesian coordinates; and 7) In the case of the (hyper)hemisphere of Procrustes-aligned shape trajectories or trajectories in Kendall's shape space, the shape component could be transformed to a polar coordinate representation for analysis with any additional vectors (size, time, etc.) analyzed as discussed above.

EXAMPLE

Figure 9A:
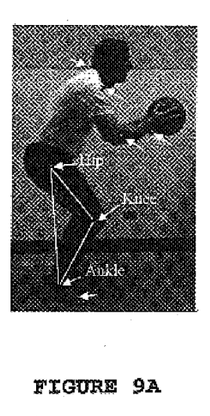
FIG. 9A illustrates a partial geometric motion analysis of the present invention for jumping showing an individual about to jump and having markers used to track the jumping motion.
Figure 9B:
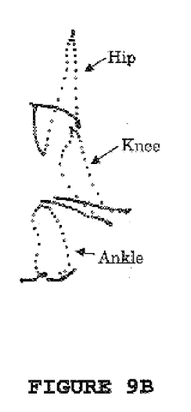
FIG. 9B illustrates raw trajectories of three points—hip, knee, and ankle—in physical space during one jump of the individual of FIG. 9A.
Figure 9C:
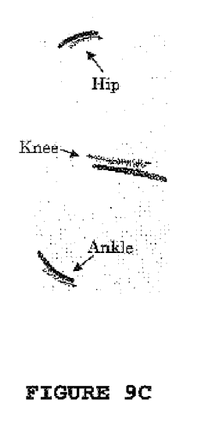
FIG. 9C illustrates geometric morphometric superimposition of triangles formed by hip, knee, and ankle for three jumps made by two individuals (indicated by pluses and circles.

FIG. 9A illustrates a partial geometric motion analysis of the present invention with real motion data. FIG. 9A shows an individual about to initiate a jump with reflective markers (landmarks) that are automatically tracked during the execution of the motion. To take advantage of the analyses provided by existing software, we focus on three of these, those indicating the location of the hip, knee, and ankle. FIG. 9B shows the raw positions of these three points during one jump by one individual. FIG. 9C shows the superimposition of the vertices of triangles formed by the hip, knee, and ankle using standard methods of geometric morphometric analysis (a Generalized Procrustes Analysis). Jumps were sampled (coordinates of the knee, hip, and ankle were recorded) at a rate of 120–175 times per jump.

Figure 9D:
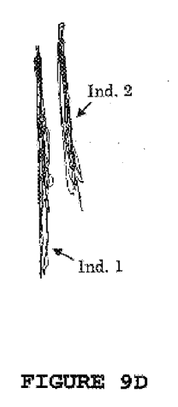
FIG. 9D illustrates motion trajectories in shape space of the triangles of FIG. 9C representing the three jumps of the two individuals of FIG. 9C.
Figure 9E:
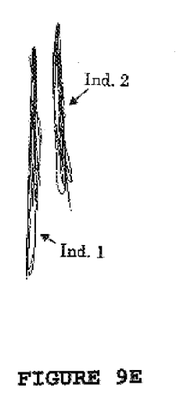
FIG. 9E illustrates motion trajectories reconstructed by the geometric motion analysis of the present invention.
Figure 9F:
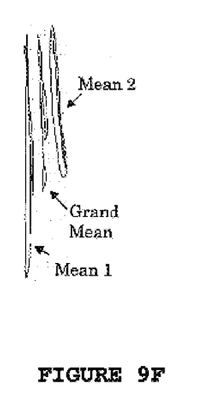
FIG. 9F illustrates Individual and grand mean motion trajectories from the geometric motion analysis of the present invention.

Unlike FIGS. 9A–C, that show the positions of points in physical space (scaled, translated, and rotated in FIG. 9C), FIGS. 9D–9F show trajectories of shape change through shape space (which is more accurately a tangent, planar approximation to the shape space) representing an entire jump. FIG. 9D shows the trajectories for three replicate jumps for two individuals, one of these trajectories represents all of the data shown in FIG. 9B up to scale, translation, and orientation. Each of these trajectories were parameterized using EFA (no standardizations, 16 EFA harmonics) and represent, in their entirety, a single point in EFA parameter space. Each such point can, in turn, be used to reconstruct its entire trajectory in the tangent to shape space (FIG. 9E). Finally, standard types of multivariate statistical operations were performed on the sets of points in the EFA parameter space, e.g., computation of means, tests of group differences, principal components analysis, etc. and the results mapped as trajectories back into the (tangent to) shape space. FIG. 9F, for example, shows the mean shape trajectories for each individual and the grand mean for both individuals. The latter are smoother than the EFA reconstructions (FIG. 9E) of individual trajectories which, in turn, are smoother than the originals (FIG. 9D).

Examination of the original shape trajectories and their reconstructions (FIGS. 9D and 9E) illustrate that there is no overlap of the replicate shape trajectories of the jumps for the two individuals. This separation probably represents the difference in the stature of the individuals. Furthermore, FIG. 9C, for instance, indicates that in the second individual, the length from the hip to the knee is relatively shorter compared to the length from the knee to the ankle than in the first individual.

Differences in the jumping motion, itself, are reflected in differences in the shapes, not location, of the trajectories. Closer examination of individual trajectories (not shown) reveal each jump trajectory to be composed of two loops, most likely due to the initial squatting prior to take-off and a knee flex upon landing. The apparent differences in the "magnitude" of the motions of the individuals results from one of the loops being relatively longer in the first individual than in the second, where the two loops were of comparable length. This difference could reflect either a greater knee flex used during the initiation of the jump or recovery, or greater extension during the peak of the jump. The exact nature of this difference could be revealed using visualization software now known or later developed. Coordinates on the longer loop would be useful to reconstruct exact positions of the knee, hip, and ankle in physical space.

Building on this last point, it is important to note that every point on the trajectories shown in FIGS. 9D–9F represent triangles formed by the hip, knee, and ankle. As such, sets of points along the trajectory could be used to draw series of triangles in the space shown in FIG. 9C or, with the inclusion of scale, translation, and orientation information, could be used map reconstructed landmark positions into the physical space represented in FIG. 9B. Such series could be linked together to generate animations of mean jumps, plotted simultaneously to compare mean jumps, or used to illustrate group differences, components of greatest variation (PCA axes), etc.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. A method for geometrically analyzing a motion of an object, the method comprising the steps of:
   choosing a set of points on the object characterizing a shape of the object during the motion, the set of points having at least three individual points to define a single realization of the motion;
   sequentially collecting Cartesian coordinates of the set of points at different times during the motion from a start point to an end point;
   treating the collection of sets of points as a sample of the motion; and
   transforming the sets of points at the different times to a common coordinate system thereby defining a trajectory of the motion.

2. The method of claim 1, wherein the common coordinate system is a hemisphere of generalized Procrustes aligned shapes.

3. The method of claim 1, wherein the common coordinate system is a Kendall shape space.

4. The method of claim 1, wherein the transformation to the common coordinate system includes an identity transformation with respect to a prior established, extrinsic coordinate system.

5. The method of claim 1, wherein the common coordinate system is augmented by vectors representing non-spatial variables.

6. A method for geometrically analyzing a motion of an object, the method comprising the steps of:
   (a) choosing a set of points on the object characterizing a shape of the object during the motion, the set of points having at least three individual points to define a single realization of the motion;
   (b) sequentially collecting Cartesian coordinates of the set of points at different times during the motion from a start point to an end point;
   (c) treating the collection of sets of points as a sample of the motion;

(d) transforming the sets of points at the different times to a common coordinate system thereby defining a trajectory of the motion; and (e) calculating elliptic Fourier coefficients describing the trajectory of the motion independent of any difference in the spacing of the different times.

7. The method of claim 6, further comprising the steps of:

(f) repeating steps (a) through (e) for at least one other realization to form a first sample of realizations together with the single realization; and (g) performing a statistical analysis on the first sample using the elliptical Fourier coefficients.

8. The method of claim 7, further comprising the steps of:

(h) repeating steps (a) through (f) to form at least a second sample of realizations; and (i) performing a statistical analysis on the first and second samples using the elliptical Fourier coefficients.

9. The method of claim 6, wherein the elliptical Fourier coefficients are expressed as Cartesian coordinates.

10. The method of claim 6, wherein the elliptical Fourier coefficients are expressed as polar coordinates.

11. The method of claim 6, wherein the common coordinate system is a hemisphere of generalized Procrustes aligned shapes.

12. The method of claim 6, wherein the common coordinate system is a Kendall shape space.

13. The method of claim 6, wherein the transformation to the common coordinate system includes an identity transformation with respect to a prior established, extrinsic coordinate system.

14. The method of claim 6, wherein the common coordinate system is augmented by vectors representing non-spatial variables.

\* \* \* \* \*